United States Patent
Li et al.

(10) Patent No.: US 10,401,245 B2
(45) Date of Patent: Sep. 3, 2019

(54) SIX-DIMENSIONAL FORCE AND TORQUE SENSOR

(71) Applicants: NANJING BIO-INSPIRED INTELLIGENT TECHNOLOGY CO., LTD., Nanjing (CN); NANJING LI-HANG INDUSTRY INSTITUTE OF BIONIC TECHNOLOGY LIMITED COMPANY, Nanjing (CN)

(72) Inventors: Chen Li, Nanjing (CN); Julu Yao, Nanjing (CN); Zhendong Dai, Nanjing (CN); Xiaofei Huang, Nanjing (CN)

(73) Assignees: NANJING BIO-INSPIRED INTELLIGENT TECHNOLOGY CO., LTD., Nanjing (CN); NANJING LI-HANG INDUSTRY INSTITUTE OF BIONIC TECHNOLOGY LIMITED COMPANY, Nanjing (CN)

( * ) Notice: Subject to any disclaimer, the term of this patent is extended or adjusted under 35 U.S.C. 154(b) by 0 days.

(21) Appl. No.: 16/081,422

(22) PCT Filed: Apr. 13, 2017

(86) PCT No.: PCT/CN2017/080439
§ 371 (c)(1),
(2) Date: Aug. 31, 2018

(87) PCT Pub. No.: WO2017/215334
PCT Pub. Date: Dec. 21, 2017

(65) Prior Publication Data
US 2019/0056279 A1 Feb. 21, 2019

(51) Int. Cl.
*G01L 5/00* (2006.01)
*G01L 5/16* (2006.01)

(52) U.S. Cl.
CPC ............ *G01L 5/167* (2013.01); *G01L 5/0042* (2013.01); *G01L 5/162* (2013.01)

(58) Field of Classification Search
CPC ........ G01L 5/167; G01L 5/0042; G01L 5/162
(Continued)

(56) References Cited

U.S. PATENT DOCUMENTS 3,948,093 A * 4/1976 Folchi ..................... B25J 9/048
73/862.044
4,763,531 A * 8/1988 Dietrich .................. G01L 5/161
73/862.044
(Continued)

FOREIGN PATENT DOCUMENTS

CN 101672705 A 3/2010
CN 102087153 A 6/2011
(Continued)

*Primary Examiner* — Max H Noori
(74) *Attorney, Agent, or Firm* — Gokalp Bayramoglu

(57) ABSTRACT

A novel six-dimensional force and torque sensor includes a central boss, a cylindrical housing arranged outside the central boss, and twelve elastic beams for connecting the central boss with the cylindrical housing. The twelve elastic beams are respectively provided with strain gauges as needed, and a bottom of the central boss is provided with a mounting hole for mounting a signal processing module. The present invention has the characteristics of self-decoupling, high rigidity, high natural frequency, desirable linearity, ideal repeatability and perfect hysteresis, and ability to measure a large torque (50 N·m). In addition, the sensor can be designed to have different measuring ranges and sensitivities by changing the dimensions of each of the elastic beams.

6 Claims, 3 Drawing Sheets

(58) Field of Classification Search
USPC .................................................. 73/862.045
See application file for complete search history.

(56) References Cited

U.S. PATENT DOCUMENTS

| | | | | |
|---|---|---|---|---|
| 7,481,121 B1* | 1/2009 | Cao | .......................... | A61C 7/00 |
| | | | | 73/862.044 |
| 9,572,545 B2* | 2/2017 | Chen | ...................... | A61B 8/085 |
| 2003/0140713 A1* | 7/2003 | Ohsato | .................... | G01L 5/162 |
| | | | | 73/862.041 |
| 2015/0185096 A1* | 7/2015 | Kim | .......................... | G01L 1/16 |
| | | | | 73/862.045 |
| 2016/0091376 A1* | 3/2016 | Sakano | .................. | G01L 5/165 |
| | | | | 73/862.043 |
| 2018/0281176 A1* | 10/2018 | Ishizuka | ................ | B25J 9/1015 |

FOREIGN PATENT DOCUMENTS

| | | | |
|---|---|---|---|
| CN | 102840944 A | 12/2012 | |
| CN | 102865947 A | 1/2013 | |
| CN | 103076131 A | 5/2013 | |
| CN | 103698076 A | 4/2014 | |
| CN | 106124113 A | 11/2016 | |
| DE | 4012829 A1 | 10/1991 | |

* cited by examiner

SIX-DIMENSIONAL FORCE AND TORQUE SENSOR

CROSS REFERENCE TO RELATED APPLICATIONS

This application is the national phase entry of International Application No. PCT/CN2017/080439, filed on Apr. 13, 2017, which is based upon and claims priority to Chinese Patent Application No. 201610428832.2, filed on Jun. 14, 2016, the entire contents of which are incorporated herein by reference.

TECHNICAL FIELD

The present invention relates to the field of automation technology, specifically relates to a novel six-dimensional force and torque sensor.

BACKGROUND

A multi-dimensional force and torque sensor refers to a force sensor capable of simultaneously measuring force components or torque components in more than two directions. In the Cartesian coordinate system, the force and torque can be respectively decomposed into three components. Therefore, the most complete form of the multi-dimensional force is a six-dimensional force and torque sensor, that is, a sensor capable of measuring three force components and three torque components simultaneously. Multi-dimensional force and torque sensors are widely used in the fields of robotics, industrial automation, military, etc.

The metal foil patch type six-dimensional sensor is widely used because of its mature technology, excellent stability as compared to piezoelectric and semiconductor sensors, and low requirements for the working environment. However, there are many disadvantages in the metal foil patch type six-dimensional sensor in the prior art:

The structure of the existing multi-dimensional force sensor cannot realize the self-decoupling, and the force (torque) of a certain or several directions of some multi-dimensional force sensors needs to be calculated by the output of other directions and the size of the structure, which will increase the systematic error; The existing multi-dimensional force sensor with a three-beam structure is relatively simple in structure, but cannot realize the self-decoupling of the structure; Moreover, the measurement range of the above-mentioned metal foil patch type six-dimensional sensor for measuring torque is generally low, and the main reason is that the increase of the torque has high requirements on the strength and rigidity of the elastomer, and also has high requirements on strength and rigidity of the connecting pin or other locating elements.

SUMMARY

In view of this, the present invention provides a novel six-dimensional force and torque sensor, which has the characteristics of being capable of measuring large torque, has self-decoupling structure, high strength, high rigidity, high natural frequency, capable of performing dynamic testing, high resolution, high precision, etc.

The present invention solves the above problems by the following technical means:

The novel six-dimensional force and torque sensor of the present invention includes a central boss, a cylindrical housing arranged outside the central boss, and twelve elastic beams for connecting the central boss with the cylindrical housing. The twelve elastic beams are respectively provided with strain gauges as needed, and the bottom of the central boss is provided with a mounting hole for mounting a signal processing module.

The twelve elastic beams are divided into a first beam group and a second beam group. The first beam group includes eight first beam bodies of the same size and structure. The second beam group includes four second beam bodies of the same size and structure. The eight first beam bodies are divided into four groups and are respectively arranged at the upper end, the lower end, the left end and the right end of the central boss. The four second beam bodies are respectively arranged between two first beam bodies of the same group.

Preferably, the central boss has a rectangular columnar structure.

Preferably, a top of the first beam body is higher than a top of the second beam body, a bottom of the first beam body is lower than a bottom of the second beam body, and the central sections of the first beam body and the second beam body are in the same plane.

Preferably, the first beam body has an L-shaped structure, and the first beam body includes a first patch area adjacent to the central boss and a first coordination area adjacent to the cylindrical housing.

Preferably, the second beam body has a three-stage structure including a second patch area symmetrically provided with two grooves on both sides of the second patch area, and a second coordination area adjacent to the central boss and adjacent to the cylindrical housing.

Preferably, twenty-four strain gauges are provided, respectively recorded as R1, R2, R3, R4, R5, R6, R7, R8, R9, R10, R11, R12, R13, R14, R15, R16, R17, R18, R19, R20, R21, R22, R23, and R24. Each four of the twenty-four strain gauges form a full bridge circuit as needed. Each full bridge circuit is respectively connected to an input end of the signal processing module, and an output end of the signal processing module is connected to a terminal, then:

The R1 and the R2 are respectively symmetrically arranged on the first patch area of the upper surface and the lower surface of the first beam body, similarly the R3 and the R4, the R5 and the R6, the R7 and the R8, the R9 and the R10, the R11 and the R12 are respectively symmetrically arranged on the first patch area of the upper surface and the lower surface of the first beam body. The R15 and the R16 are respectively symmetrically arranged on both sides of the first beam body with respect to the vertical center line of the central boss, similarly the R13 and the R14 are respectively symmetrically arranged on both sides of the first beam body with respect to the vertical center line of the central boss. The R17 and the R18 are respectively symmetrically arranged on the second patch area of the upper surface and the lower surface of the second beam body, similarly the R19 and the R20, the R21 and the R22, the R23 and the R24 are respectively symmetrically arranged on the second patch area of the upper surface and the lower surface of the second beam body.

Preferably, the upper end of the central boss is provided with a square push-pull. The square push-pull cooperates with a connecting flange. The top of the square push-pull is provided with an M10 threaded hole. The M10 threaded hole is used for fastening connection between the square push-pull and the connecting flange.

In the novel six-dimensional force and torque sensor of the present invention, a plurality of strain gauges distributed on the twelve elastic beams respectively forms a full bridge type detection circuit as needed, and bridge arm voltages of four strain gauges in the coupling direction bridge mutually offset, thus can realize the self-decoupling of the structure. When the force and torque are applied on the central boss, the twelve elastic beams will be subjected to tension-compression deformation or bending deformation, thereby causing a change in the voltage signal outputted by each full bridge circuit. By analyzing and processing these signals, it is convenient to obtain the force or torque in each direction. Therefore, the present invention has the characteristics of self-decoupling, high rigidity, high natural frequency, desirable linearity, ideal repeatability and perfect hysteresis, and ability to measure a large torque (50 N·m). In addition, the sensor can be designed to have different measuring ranges and sensitivities by changing the dimensions of each of the elastic beams.

BRIEF DESCRIPTION OF THE DRAWINGS

Referring to FIGS. 1-3, cylindrical housing-1, central boss-2, first beam body-31, first patch area-311, first coordination area-312, second beam body-32, second patch area-321, second coordination area-322, strain gauge-4, signal processing module-5, square push-pull-6.

DETAILED DESCRIPTION OF THE EMBODIMENTS

Figure 1:
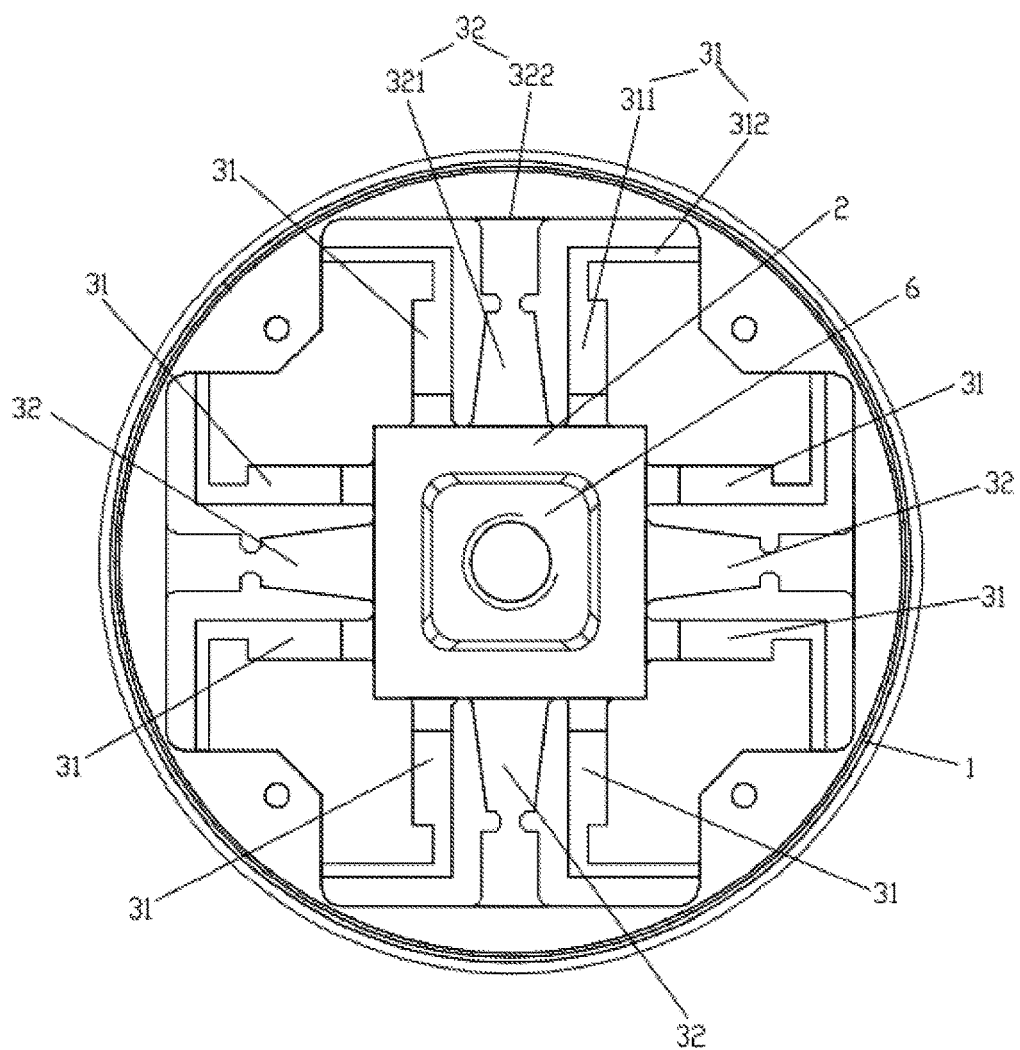
FIG. 1 is a structural diagram of the novel six-dimensional force and torque sensor of the present invention before attaching the strain gauges.

In the description of the present invention, it should be understood that the orientation or positional relationship indicated by the terms "center", "upper", "lower", "front", "back", "left", "right", "vertical", "horizontal", "top", "bottom", "inside", "outside", etc. is based on the orientation or positional relationship shown in the drawings, which is only intended to facilitate the description of the present invention and to simplify the description, rather than to indicate or imply that the device or element referred to must have a particular orientation, be constructed and operated in a particular orientation. Therefore, it cannot be construed as limitations to the present invention.

The terms "first" and "second" are used for descriptive purposes only and should not be construed as indicating or implying a relative importance or implicitly indicating the number of technical features indicated. Thus, features limited by the terms "first" or "second" may include one or more of the features either explicitly or implicitly. In the description of the present invention, the meaning of "a plurality" is two or more unless otherwise specified.

Figure 2:
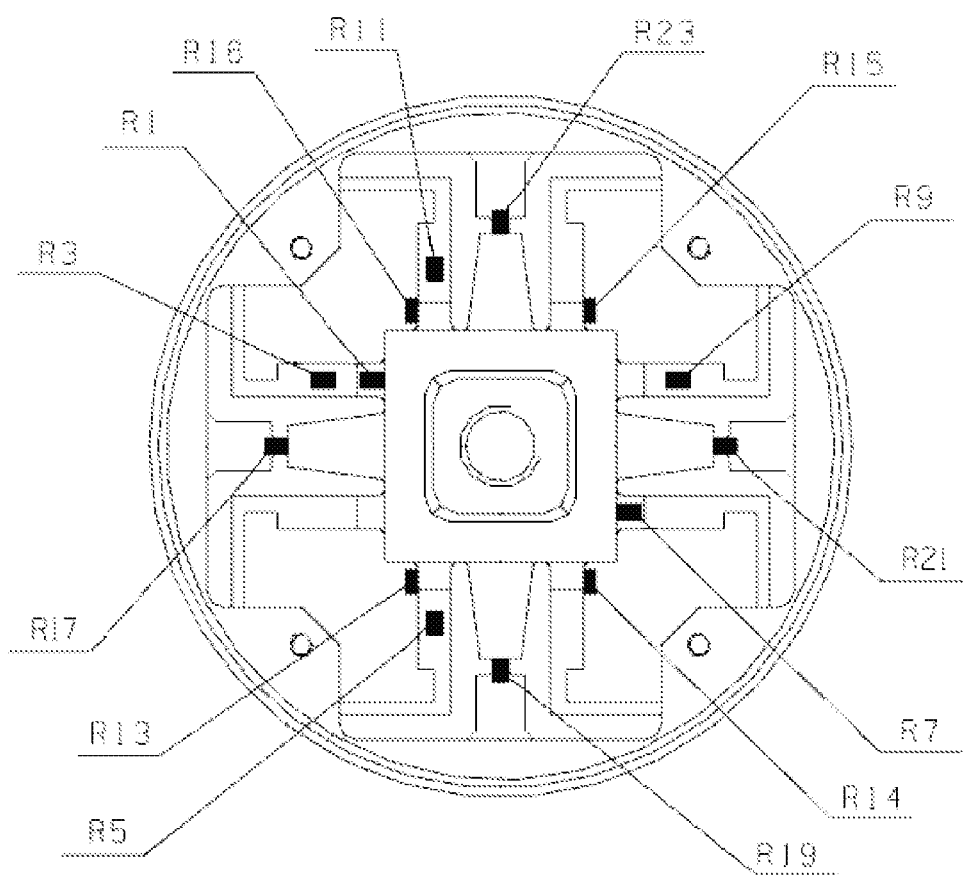
FIG. 2 is a structural diagram of the novel six-dimensional force and torque sensor of the present invention after attaching the strain gauges.
Figure 3:
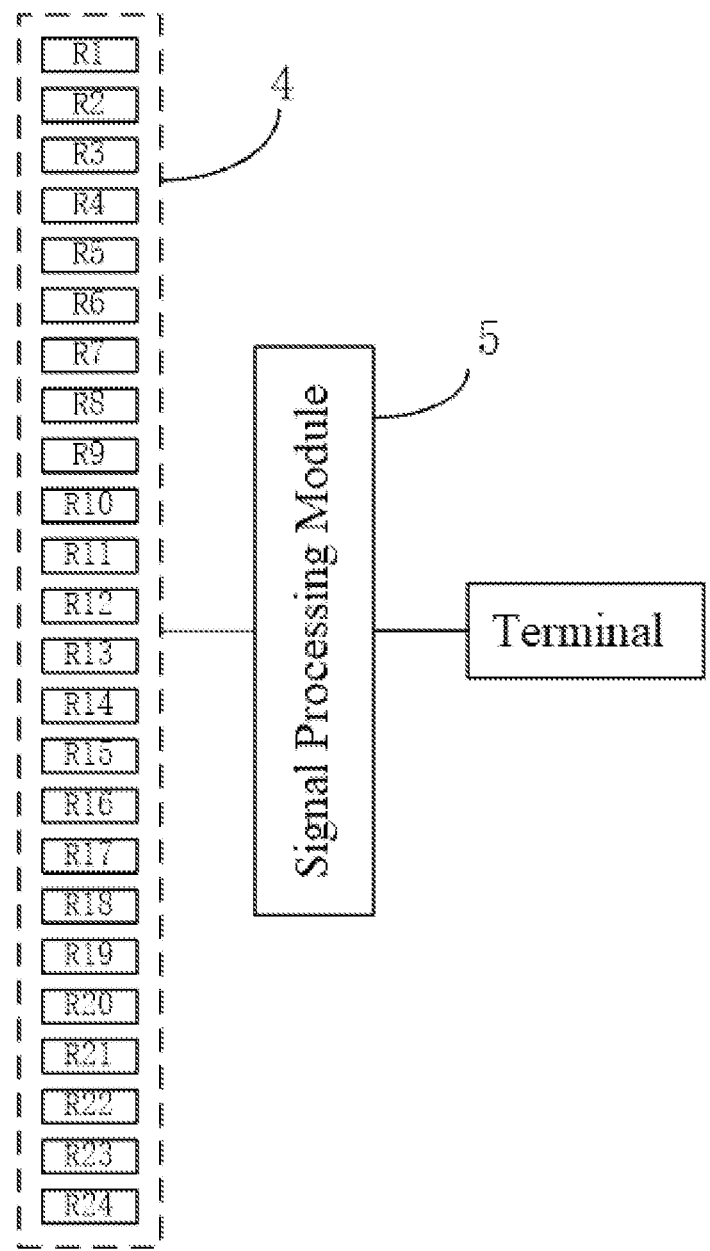
FIG. 3 is a block diagram of a circuit principle of the novel six-dimensional force and torque sensor of the present invention.

The present invention will be described in detail below with reference to the accompanying drawings. Referring to FIGS. 1-3: the novel six-dimensional force and torque sensor of the present embodiment includes central boss 2, cylindrical housing 1 arranged outside the central boss 2, and twelve elastic beams for connecting the central boss 2 with the cylindrical housing 1. The twelve elastic beams are respectively provided with strain gauges 4 as needed, and the bottom of the central boss 2 is provided with mounting hole (not shown in the drawings) for mounting signal processing module 5. During installation, the signal processing module 5 is installed at the lower end of the central boss 2 through the mounting hole.

Specifically, the twelve elastic beams are divided into first beam group and second beam group. The first beam group includes eight first beam bodies 31 of the same size and structure. The second beam group includes four second beam bodies 32 of the same size and structure. The eight first beam bodies 31 are divided into four groups and are respectively arranged at the upper end, the lower end, the left end and the right end of the central boss 2. The four second beam bodies 32 are respectively arranged between two first beam bodies 31 of the same group. Thus, a structural form for force and torque measurement is achieved, and the structural strength, rigidity and natural frequency are improved at the same time.

The novel six-dimensional force and torque sensor of the present embodiment, has a plurality of strain gauges 4 distributed on the twelve elastic beams respectively form full bridge type detection circuits as needed, and bridge arm voltages of four strain gauges 4 in the coupling direction bridge get mutually offset, thus realizing the self-decoupling of the structure. When the force and torque are applied on the central boss 2, the twelve elastic beams will be subjected to tension-compression deformation or bending deformation, thereby causing a change in the voltage signal outputted by each full bridge circuit. By analyzing and processing these signals, it is convenient to obtain the force or torque in each direction. Therefore, the present invention has the characteristics of self-decoupling, high rigidity, high natural frequency, desirable linearity, ideal repeatability and perfect hysteresis, and ability to measure a large torque (50 N·m). In addition, the sensor can be designed to have different measuring ranges and sensitivities by changing the dimensions of each of the elastic beams.

In order to improve the rigidity of the elastomer, as a further improvement of the above technical solution, the central boss 2 is configured to have a rectangular columnar structure.

In order to increase the strength of the elastomer, as a further improvement of the above technical solution, a top of the first beam body 31 is higher than a top of the second beam body 32, and a bottom of the first beam body 31 is lower than a bottom of the second beam body 32.

For ease of use and to increase the strength of the elastomer, as a further improvement of the above technical solution, the upper end of the central boss 2 is provided with square push-pull 6. The square push-pull 6 has a large carrying capacity. The square push-pull 6 cooperates with a connecting flange (not shown in the drawings). Specifically, the top of the square push-pull 6 is provided with an M10 threaded hole. The M10 threaded hole is used for fastening connection between the square push-pull 6 and the connecting flange. The square push-pull 6 cooperates with the connecting flange to realize a gapless movement, which can be used for dynamic measurement (such as reciprocating motion). The rigidity and strength of the assembly between the square push-pull 6 and the connecting flange both meet the requirements of the large torque working condition.

In the present embodiment, the first beam body 31 has an L-shaped structure, the first beam body 31 includes first patch area 311 adjacent to the central boss 2 and first coordination area 312 adjacent to the cylindrical housing 1.

The second beam body 32 has a three-stage structure including second patch area 321 symmetrically provided with two grooves on both sides of the second patch area 321, and second coordination area 322 adjacent to the central boss and the cylindrical housing.

Specifically, the first coordination area 312 and the second coordination area 322 are respectively configured to improve the strains of the first patch area 311 and the second patch area 321, and increase the strengths of the first beam body 31 and the second beam body 32 and the rigidity of the overall structure of the elastomer.

A plurality of strain gauges 4 are represented by Rn (n=1, 2, 3, 4 . . . ) respectively. In the present embodiment, twenty-four strain gauges 4 are provided, respectively recorded as R1, R2, R3, R4, R5, R6, R7, R8, R9, R10, R11, R12, R13, R14, R15, R16, R17, R18, R19, R20, R21, R22, R23, and R24. Each four of the twenty-four strain gauges 4 form a full bridge circuit as needed, each full bridge circuit is respectively connected to an input end of the signal processing module 5, and an output end of the signal processing module is connected to a terminal, then:

The R1 and the R2 are respectively symmetrically arranged on the first patch area 311 of the upper surface and the lower surface of the first beam body 31, similarly the R3 and the R4, the R5 and the R6, the R7 and the R8, the R9 and the R10, the R11 and the R12 are symmetrically arranged on the first patch area 311 of the upper surface and the lower surface of the first beam body 31. The R15 and the R16 are respectively symmetrically arranged on both sides of the first beam body 31 with respect to the vertical center line of the central boss 2, similarly the R13 and the R14 are respectively symmetrically arranged on both sides of the first beam body 31 with respect to the vertical center line of the central boss 2. The R17 and the R18 are respectively symmetrically arranged on the second patch area 321 of the upper surface and the lower surface of the second beam body 32, similarly the R19 and the R20, the R21 and the R22, the R23 and the R24 are respectively symmetrically arranged on the second patch area 321 of the upper surface and the lower surface of the second beam body 32.

Specifically, the R1 and the R2 are respectively symmetrically arranged on the upper surface and the lower surface of the first beam body 31, similarly R7 and the R8 are respectively symmetrically arranged on the upper surface and the lower surface of the first beam body 31. The R1 and the R7 are respectively arranged in an antisymmetric manner, similarly the R2 and the R8 are respectively arranged in an antisymmetric manner.

The R3 and the R4 are respectively symmetrically arranged on the upper surface and the lower surface of the first beam body 31, similarly the R5 and the R6, the R9 and the R10, the R11 and the R12 are respectively symmetrically arranged on the upper surface and the lower surface of the first beam body 31. The R3 and the R9 are respectively symmetrically arranged with respect to a center line of the vertical direction of the central boss 2, similarly the R4 and the R10 are respectively symmetrically arranged with respect to a center line of the vertical direction of the central boss 2. The R5 and the R11 are respectively symmetrically arranged with respect to a center line of the horizontal direction of the central boss 2, similarly the R6 and the R12 are respectively symmetrically arranged with respect to a center line of the horizontal direction of the central boss 2.

The R17 and the R21 are respectively symmetrically arranged with respect to a center line of the vertical direction of the central boss 2, similarly the R18 and the R22 are respectively symmetrically arranged with respect to a center line of the vertical direction of the central boss 2. The R19 and the R23 are respectively symmetrically arranged with respect to a center line of the horizontal direction of the central boss 2, similarly the R20 and the R24 are respectively symmetrically arranged with respect to a center line of the horizontal direction of the central boss 2. The R17 and the R18 are respectively symmetrically arranged on the upper surface and the lower surface of the second beam body 32, similarly the R19 and the R20, the R21 and the R22, the R23 and the R24 are respectively symmetrically arranged on the upper surface and the lower surface of the second beam body 32.

Finally, the above embodiments are only used to illustrate the technical solutions of the present invention, and are not intended to limit the present invention. Although the present invention has been described in detail with reference to the preferred embodiments, a person skilled in the art should understand that the present invention may be modified or equivalently substituted without departing from the spirit and scope of the present invention, which should be included within the scope of the appended claims.

What is claimed is:

1. A six-dimensional force and torque sensor, comprising a central boss, a cylindrical housing arranged outside the central boss, and twelve elastic beams for connecting the central boss with the cylindrical housing, wherein the twelve elastic beams are respectively provided with a plurality of strain gauges, and a bottom of the central boss is provided with a mounting hole for mounting a signal processing module;

the twelve elastic beams are divided into a first beam group and a second beam group, the first beam group comprises eight first beam bodies of a first same size and structure, and the second beam group comprises four second beam bodies of a second same size and structure, the eight first beam bodies are divided into four groups and are respectively arranged at an upper end of the central boss, a lower end of the central boss, a left end of the central boss and a right end of the central boss, and the four second beam bodies are respectively arranged between two first beam bodies of a same group; wherein a top of the first beam body is higher than a top of the second beam body, and a bottom of the first beam body is lower than a bottom of the second beam body.

2. The six-dimensional force and torque sensor of claim 1, wherein the central boss has a rectangular columnar structure.

3. The six-dimensional force and torque sensor of claim 1, wherein the first beam body has an L-shaped structure, and the first beam body comprises a first patch area adjacent to the central boss and a first coordination area adjacent to the cylindrical housing.

4. The six-dimensional force and torque sensor of claim 1, wherein the second beam body has a three-stage structure comprising a second patch area symmetrically provided with two grooves on both sides of the second patch area, and a second coordination area adjacent to the center boss and adjacent to the cylindrical housing.

5. The six-dimensional force and torque sensor of claim 4, wherein the plurality of strain gauges include twenty four strain gauges R1, R2, R3, R4, R5, R6, R7, R8, R9, R10, R11, R12, R13, R14, R15, R16, R17, R18, R19, R20, R21, R22, R23, and R24, each four strain gauges of the twenty four strain gauges form a full bridge circuit, and each full bridge circuit is respectively connected to an input end of the signal processing module, and an output end of the signal processing module is connected to a terminal, wherein, the R1 and the R2 are respectively symmetrically arranged on a first patch area of an upper surface and a lower surface of the first beam body, the R3 and the R4, the R5 and the R6, the R7 and the R8, the R9 and the R10, the R11 and the R12 are respectively symmetrically arranged on the first patch area of an upper surface and a lower surface of the first beam body; the R16 and the R15 are respectively symmetrically arranged on both sides of the first beam body with respect to a vertical center line of the central boss, the R13 and the R14 are respectively symmetrically arranged on both sides of the first beam body with respect to a vertical center line of the central boss; the R17 and the R18 are respectively symmetrically arranged on the second patch area of an upper surface and a lower surface of the second beam body, the R19 and the R20, the R21 and the R22, the R23 and the R24 are respectively symmetrically arranged on the second patch area of an upper surface and a lower surface of the second beam body.

6. The six-dimensional force and torque sensor of claim 1, wherein the upper end of the central boss is provided with a square push-pull; the square push-pull cooperates with a connecting flange; a top of the square push-pull is provided with an M10 threaded hole, and the M10 threaded hole is used for fastening connection between the square push-pull and the connecting flange.

* * * * *